United States Patent
Klapper et al.

(10) Patent No.: US 12,225,875 B2
(45) Date of Patent: Feb. 18, 2025

(54) BUTTER-MAKING METHOD

(71) Applicant: GEA MECHANICAL EQUIPMENT GMBH, Delde (DE)

(72) Inventors: Siegfried Klapper, Herzebrock-Clarholz (DE); Carsten Bräutigam, Niederstotzingen (DE)

(73) Assignee: GEA Mechanical Equipment GmbH, Oelde (DE)

( * ) Notice: Subject to any disclaimer, the term of this patent is extended or adjusted under 35 U.S.C. 154(b) by 1013 days.

(21) Appl. No.: 16/487,472

(22) PCT Filed: Feb. 7, 2018

(86) PCT No.: PCT/EP2018/052994
§ 371 (c)(1),
(2) Date: Aug. 21, 2019

(87) PCT Pub. No.: WO2018/153660
PCT Pub. Date: Aug. 30, 2018

(65) Prior Publication Data
US 2020/0000056 A1 Jan. 2, 2020

(30) Foreign Application Priority Data
Feb. 21, 2017 (DE) ...................... 10 2017 103 562.1

(51) Int. Cl.
*A01J 15/26* (2006.01)
*A01J 15/02* (2006.01)
*A01J 17/00* (2006.01)
*A23C 15/02* (2006.01)

(52) U.S. Cl.
CPC ............... *A01J 15/26* (2013.01); *A01J 15/02* (2013.01); *A01J 17/00* (2013.01); *A23C 15/02* (2013.01)

(58) Field of Classification Search
CPC ... A01J 15/26; A01J 5/02; A01J 17/00; A23C 15/02
USPC ........................................................ 426/231
See application file for complete search history.

(56) References Cited

U.S. PATENT DOCUMENTS

| | | | |
|---|---|---|---|
| 4,266,425 A | | 5/1981 | Allport |
| 6,036,057 A | * | 3/2000 | Poutiatine ........... B05B 11/0056 |
| | | | 222/137 |
| 6,047,598 A | * | 4/2000 | Otto ...................... G01F 23/284 |
| | | | 340/621 |
| 2006/0005555 A1 | * | 1/2006 | Alappat ............. H05K 7/20563 |
| | | | 257/369 |
| 2011/0026357 A1 | * | 2/2011 | Ohtsuka .................. A01J 15/26 |
| | | | 366/118 |
| 2014/0272029 A1 | | 9/2014 | Heymann et al. |
| 2015/0361372 A1 | * | 12/2015 | Shekarriz ................ C10L 5/445 |
| | | | 71/8 |
| 2017/0198731 A1 | * | 7/2017 | Sugano ................. E02F 9/2289 |

FOREIGN PATENT DOCUMENTS

| | | |
|---|---|---|
| CN | 102894108 A | 1/2013 |
| DE | 2011158 A1 | 9/1970 |
| DE | 102009039272 A1 | 3/2011 |
| DE | 102011117195 A1 | 5/2013 |
| EP | 2319297 A1 | 5/2011 |
| JP | S56501499 A | 10/1981 |

OTHER PUBLICATIONS

NPL Siegfried et al. (English translation of DE 102009039272 A1) (Year: 2009).*
Fig 1 of NPL Siegfried et al. (Year: 2009).*
Fig 2 of NPL Siegfried et al. (Year: 2009).*
International Search Report mailed Apr. 3, 2018 in related/corresponding International Application No. PCT/EP2018/052994.
Search Report created on Nov. 14, 2017 in related/corresponding DE Application No. 10 2017 103 562.1.
Written Opinion mailed Apr. 3, 2018 in related/corresponding International Application No. PCT/EP2018/052994.
Chen et al., "Ghee process shortening device comprises a stirring cylinder, a separating cylinder, a first pressure refining chamber and a second pressure refining chamber, which are respectively provided with a material inlet and a material outlet," XP002779403, WPI / 2017 Clarivate Analytics, Jan. 30, 2013, vol. 2013, No. 33.
Office Action dated Sep. 28, 2021 in related/corresponding JP Application No. 2019-545249.

\* cited by examiner

*Primary Examiner* — Erik Kashnikow
*Assistant Examiner* — Bhaskar Mukhopadhyay
(74) *Attorney, Agent, or Firm* — PATENT PORTFOLIO BUILDERS PLLC

(57) ABSTRACT

A method for producing butter in a buttermaking machine involves using a rotatable beater, in the buttermaking cylinder, to form butter grain and buttermilk with cream supplied to the cylinder. In the drum for the post-buttermaking process, a post-buttermaking process is performed, during which a butter grain size is adjusted. The butter grain is kneaded in the first press, which includes a hollow base body containing one or two screw conveyors, the speed of which can be regulated by a speed-regulated drive, and in addition, the basic water content of the butter is reduced and in the first mixing section, the cross-section of at least one outlet of a throttle device is modified, one or both of the steps and being carried out in an electronically self-regulating manner.

17 Claims, 3 Drawing Sheets

BUTTER-MAKING METHOD

BACKGROUND AND SUMMARY OF THE INVENTION

Figure 1:
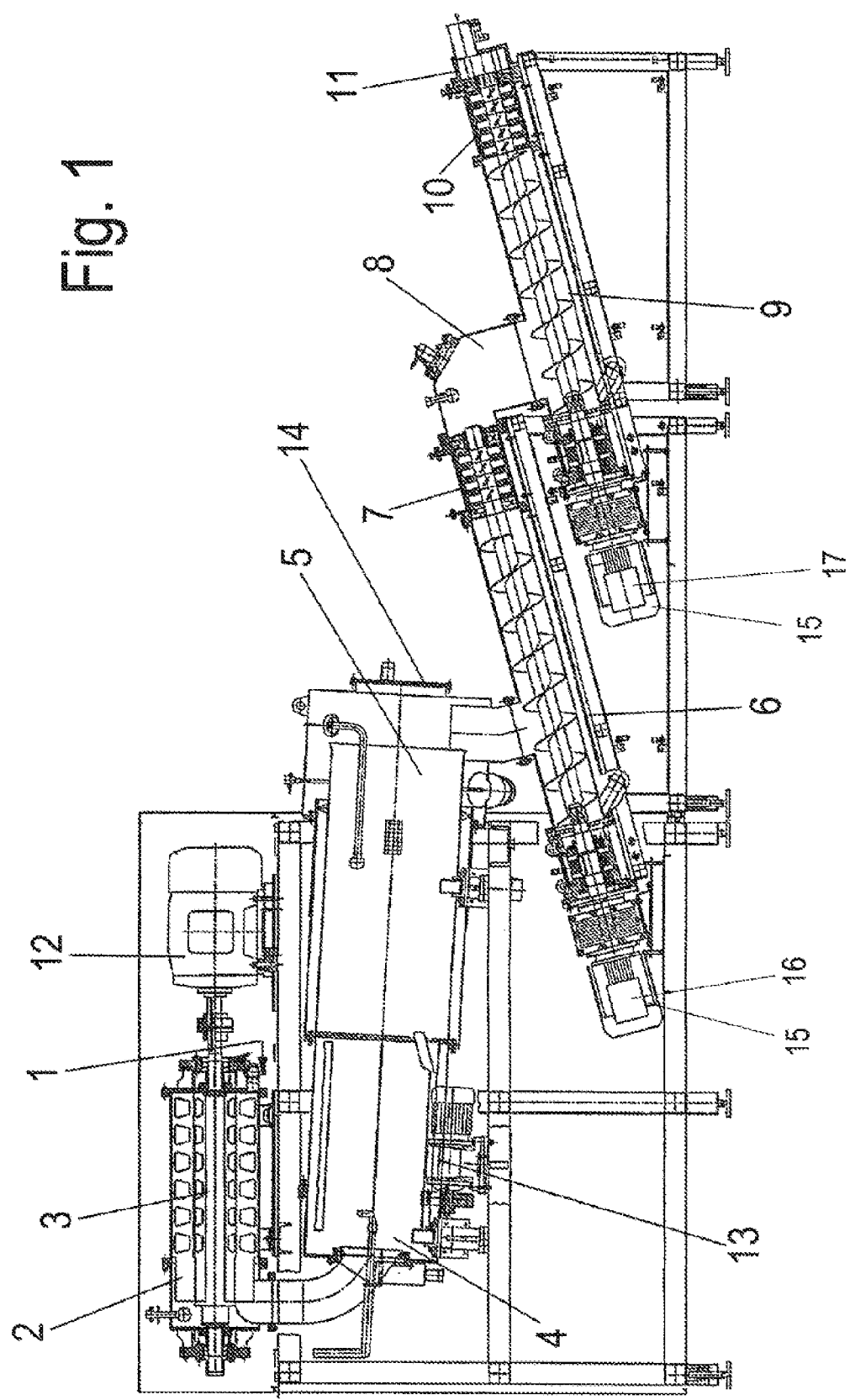

Exemplary embodiments of the invention relate to a butter-making method.

The continuous butter-making by means of a machine specified by Dr. Fritz and dating back to the year 1941 has become widely accepted in the field of industrial butter-making processes. This machine and the corresponding method have served to ensure a good, consistent quality of the butter with low fat losses.

The Fritz/Eisenreich method allowed the operating steps involved in whipped cream formation, subsequent butter grain formation, the separation of buttermilk and kneading of the butter to be partially automated in one continuous process. In this method time the processes of butter grain formation are achieved by butter-making drums and the kneading and extraction of the butter mass by extraction presses with motorized screw drives.

For a long time, any refinement of the automation process was possible only to a limited degree, since it is dependent on many factors, which are predominantly determined by the cream as starter material and the processing thereof. Besides the initial characteristics of the cream, for example the fat content and previous ripening of the cream, process parameters such as the cream temperature, the feed capacity and the beater speed are important characteristic variables for the butter-making process.

Due to these constantly changing characteristics of the cream, the processing has hitherto often still been monitored manually is and adjusted as necessary by varying the process parameters. Here a constant visual check on the characteristics, together with empirical values and an intuitive feel are needed in order to undertake an adjustment.

The procedure in the known manual technique corresponds to the structure of a feedback control circuit. The outcome of the process—in this case the quality of the butter—is assessed and a process variable is increased or reduced according to the deviation from a desired condition. This is complicated and since the reaction time from a variation of the process variable to a change in the quality at the machine outlet is several minutes, manual adjustments to the process parameters can be undertaken only very slowly and carefully. The butter-making process therefore exhibits a significant response time delay. Due to the response time delay in the process, the basic water content of the butter produced is therefore subject to certain—unwanted—fluctuations.

Efforts have already been made, through suitable measures, to make the butter-making process self-regulating, whilst moderating the so-called response time delay of the process. These measures, however, have only been partially successful.

DE 10 2011 117 195 A1, for example, describes a method for improving an automated butter-making process. Here an approximation to a desired butter quality is achieved, in particular, by an electronic self-adjustment of the beater speed in the butter-making cylinder. The optimum beater speed for phase reversal is automatically or autonomously adjusted by electronic means when, for example, the feed capacity, the temperature, the fat content of the cream or the ripeness of the cream varies.

In itself this method has proved successful, but it serves to automate only part of the butter-making process.

Against this background, the present invention is directed to a further improvement in the automation of butter production.

A method is created for producing butter, or rather a method by which butter is produced in a butter-making machine, which comprises at least one inlet, at least one butter-making cylinder with a rotatable beater, at least one butter-refining drum and at least one first extraction press, and at least one mixing section arranged downstream thereof, comprising at least the following steps:

- in one step 100), in the butter-making cylinder a rotatable beater is used to form butter grains and butter milk from cream supplied to the cylinder,
- in one step 300), in the butter-refining drum, a butter-refining process is performed, in which a butter grain size is adjusted,
- in one step 400), in the first extraction press, which comprises a hollow, in particular a single or double-hollow cylindrical, body containing one rotatable or two or contra-rotating screw conveyors, the speed or common speed of which can be regulated by an adjustable-speed drive, the butter grains are kneaded and preferably transformed into a homogenous "water-in-oil emulsion"—i.e. into a butter, wherein the basic water content of the butter is also reduced,
- in a step 500), in the first mixing section, the size or aperture width of the outlet openings of a restrictor is varied,
- wherein one or both of the steps 400) and 500) are performed in an electronically self-regulating manner.

It is advantageous for this purpose if, in the step 400), the pressure in the first extraction press exerted by the butter grains or the butter forming from the butter grains is determined and used as a first reference variable of the electronic control.

It is moreover advantageous if, in the step 400), a filling level in the extraction press is determined and used as a further, second reference variable of the electronic control.

Then, in the step 400), the speed of the screw conveyor of the first extraction press can easily be used as a first control variable of the electronic control.

Furthermore, in the step 500), the butter can be discharged from the mixing section through a restrictor provided with one or more variable-sized openings, the aperture of the opening(s) in the restrictor being used as a second control variable of the electronic control in the step 400).

The extraction pressing process is regulated by the speed of the screw in the first extraction press and by the aperture of the restrictor in the associated mixing section. In the method according to DE 10 2011 117 195 A1 both are performed by manual adjustment of the settings by the machine operator, and advantageously the invention automatically regulates these by electronic means, something which has not been considered according to the prior art, in particular because it was not possible to select suitable reference variables for the electronic control and to suitably measure and determine these. The invention solves this problem.

The main purpose of the one or more extraction presses is to transport the butter at a minimum screw speed varying as a function of the flow rate, in order to avoid backpressure with a simultaneous reduction in the basic water content through the extraction pressing process. A sufficiently low basic water content in the extraction pressing process can be achieved only if the first extraction press is completely filled. An optimally filled extraction press here demands constant observation of the extraction press and if necessary, a manual intervention in the speed of the screw conveyor of the extraction press.

The invention advantageously automates this process and similarly also the subsequent mixing process.

The electronic control in this respect advantageously encompasses an electronic determination of the filling level and the pressure inside the extraction press. By optimizing the ratio of the screw speed to the flow rate and the fine control of the aperture of a restrictor, the system can be rapidly adjusted and run with stable product parameters. The second main function of kneading and mixing is always completed in the second extraction press (kneader) and can likewise be automated.

The self-learning control described above also has the advantage that due to the direct measurement of the pressure and the filling level in the first extraction press there is scarcely any response time delay in the control circuit.

BRIEF DESCRIPTION OF THE DRAWING FIGURES

Figure 2:
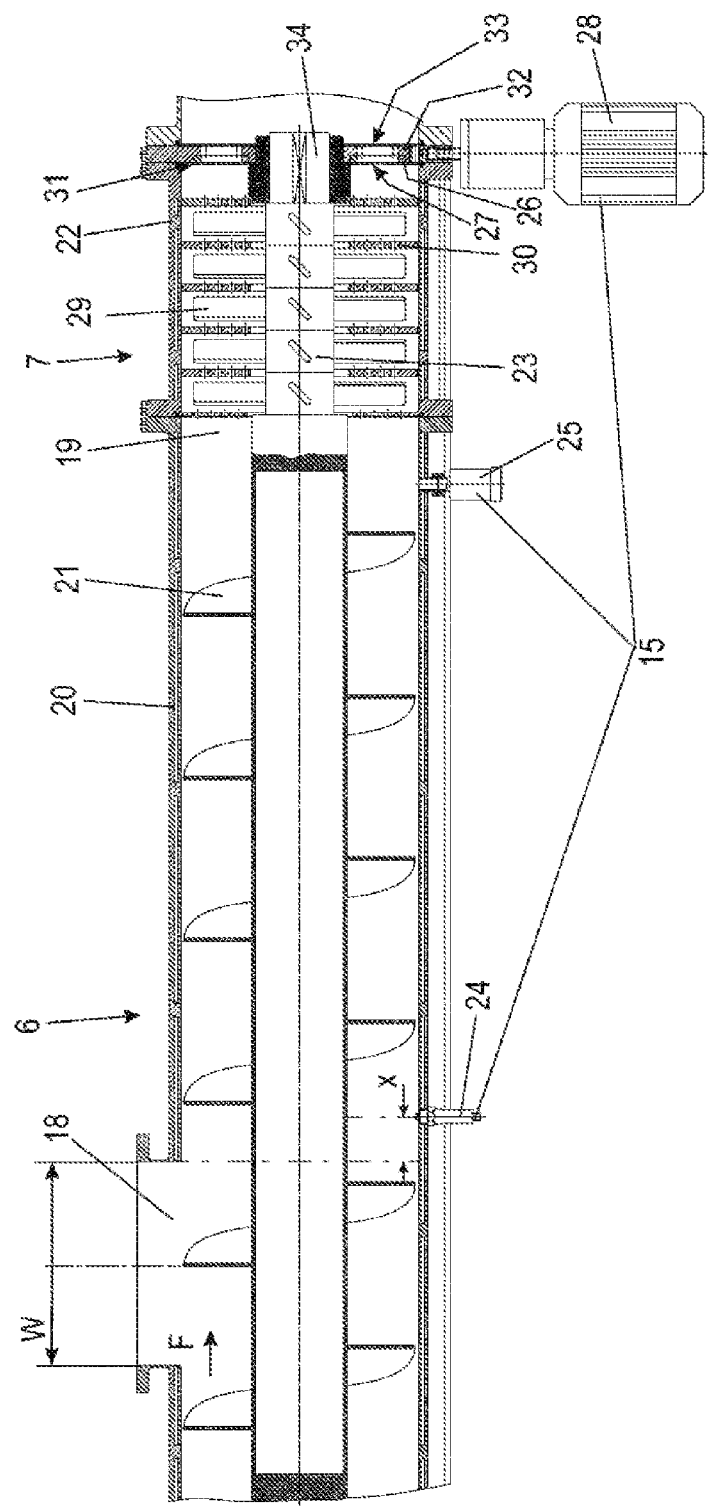

An exemplary embodiment of the invention is explained referring to the drawing attached, and figures are produced illustrating the solution to the problem. The figures show:

FIG. 1 a schematic representation of a butter-making machine, which is operated substantially according to the Fritz/Eisenreich method;

FIG. 2 a sectional representation of the first extraction press of the machine in FIG. 1.

Figure 3:
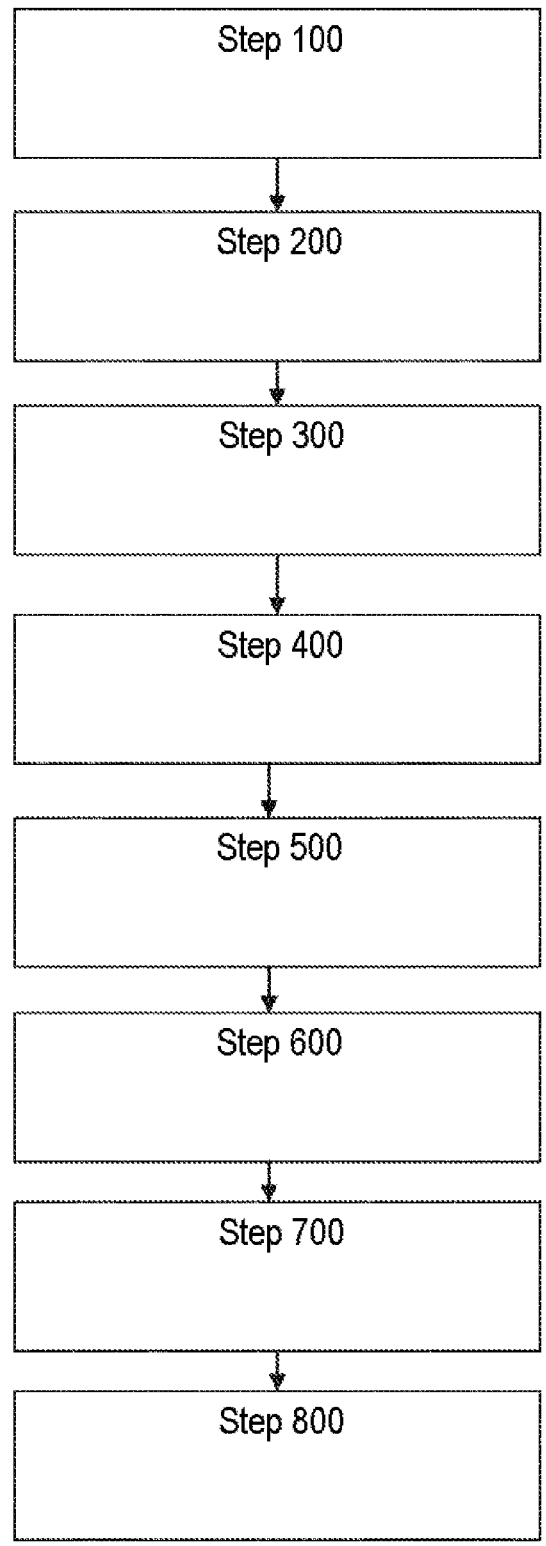

FIG. 3 a simplified flow chart of one exemplary embodiment of a method according to the invention.

DETAILED DESCRIPTION

FIG. 1 shows a butter-making machine provided for the production of butter, which comprises an inlet 1 for cream as the primary product for the production of butter, and downstream of this a butter-making cylinder 2 with a rotatably driven beater 3 for forming butter grains and butter milk from the cream supplied. The beater 3 is driven by a beater drive 12.

In the butter-making cylinder 2, in a step 100, butter grains and butter milk are formed from the cream supplied.

The butter grains emerging from the butter-making cylinder 2 can then be transferred or fed into a cooling section 4. In the cooling section 4 the butter grains take on a harder consistency, making them easier to process.

In the cooling section, in a step 200, the butter grains can therefore be cooled.

From the cooling section 4 the butter grains, cooled in this way, are fed into a butter-refining drum 5. In the butter-refining drum 5, in a step 300, a butter-refining process is performed. In this butter-refining process step the butter grain size is adjusted. The butter-refining drum 5 is driven by a drive 13.

From the butter-refining drum 5 the butter grains, adjusted in this way, are fed into an inlet 18 of a first extraction press 6. The first extraction press 6, in a step 400), kneads the butter grains and presses water out of them. In a step 400) it preferably transforms the butter grains into a homogenous "water-in-oil emulsion"—i.e., into a butter—and at the same time relieves this butter of butter milk residues in order to reduce the basic water content. The first extraction press 6 is driven by a drive 16. An essential purpose of the one extraction press 6 and any further extraction press 9 in this respect is to transport the butter further at a minimum screw speed varying as a function of the flow rate, in order to avoid backpressure whilst at the same time reducing the basic water content through the extraction pressing process. A sufficiently low basic water content in the extraction pressing process can be achieved only if the first extraction press is completely filled. To do this, according to the prior art the speed of the first extraction press 6 and therefore its delivery rate in kg/min and the pressure built up by this is set manually by the machine operator.

Following on from the first extraction press 6 at its outlet 19 is at least one first mixing section 7. In the first mixing section 7, in a step 500, water, acid concentrates and/or brine is added to the "water-in-oil emulsion" or to the butter resulting from step 400, in order to improve the taste and consistency of the butter by mixing these ingredients with the butter.

Then, in a step 600, the butter resulting from step 500 has air extracted from it in a vacuum chamber 8, in order to improve its keeping qualities.

Then, the butter emerging from step 600 can be fed into an inlet of a second extraction press 9, in order to extract more water in a step 700 and in this way to further optimize the water content. Connected in turn to the outlet of the second extraction press 9 is at least one mixing section—here termed the second mixing section 10. Through a mixing process in a step 800 this ensures a uniform distribution of the water content in the butter and an optimization of the water content. The second extraction press 9 is driven by a drive 17.

A discharge pump 11 serves to drain the butter produced in step 800 out of the second mixing section 10 and thereby out of the butter-making machine.

A visual check on the butter-refining process can additionally be undertaken through a viewing window 14.

For processing sensed values and for feedback and control of the butter-making process, in particular an electronic control described below, the butter-making machine is provided with a feedback and control unit 15 (not represented here), which preferably takes the form of a computer and is connected at least to the measuring devices and/or sensor device and drives and the like.

FIG. 2 shows a full section through the first extraction press 6 and the first mixing zone 7 of the butter-making machine in FIG. 1, the construction and operation of which are described in more detail below. The second extraction press 9 and the second mixing zone 10 may be identical in their construction and operation.

The first extraction press 6 here in a preferred embodiment comprises a double hollow-cylindrical body 20. The double hollow-cylindrical body 20 comprises the inlet 18, which here takes the form of an inlet shaft. Through the inlet 18, the first extraction press 6 is filled, virtually continuously, with cooled butter grains from the cooling section 4 or the butter-refining drum 5.

Two contra-rotating screw conveyors 21, which are set in rotational movement by the drive 16 (not represented here, see FIG. 1) and which convey the butter grains or the butter towards an outlet 19, are arranged in the double hollow-cylindrical body 20 of the first extraction press. The drive 16 is equipped with a speed regulating device.

In order to simplify the description in the following text, only one hollow-cylindrical body 20 and one screw conveyor 21 are described. This similarly applies to the body 22, the mixer shafts 23, the agitator blades 29 and the perforated plates 30. The following description in as much applies equally to embodiments having a single hollow-cylindrical body and a single screw and to the preferred embodiment described above having a double hollow-cylindrical body 20 of the first extraction press and with two contra-rotating screw conveyors 21 therein.

In the step 700, the rotational movement of the screw conveyor 21 in the hollow-cylindrical body 20 kneads the butter grains in the first extraction press 6 and preferably transforms it into a homogenous "water-in-oil emulsion". At the same time the basic water content is reduced.

Following on from the hollow-cylindrical body 20 of the first extraction press 6 is the first mixing section 7. Here it is flanged-mounted onto the outlet 19 of the body 20. The first mixing section 7 here likewise comprises a hollow-cylindrical body 22. The hollow-cylindrical body 22 of the first mixing section 7 comprises multiple axially spaced perforated plates 30. Also housed in the hollow-cylindrical body 22 is a mixer shaft 23. The mixer shaft 23 comprises multiple agitator blades 29. Through the interaction of the rotating agitator blades 29 with the fixed perforated plates 30, a homogenous mixture of the butter with the metered additive substances such as water, acid concentrates and/or brine is advantageously achieved. Any backpressure is to be avoided. The aim is rather for a continuous delivery of the butter.

The mixer shaft 23 here is designed as an extension of the screw conveyor 21, so that the screw conveyor 21 and the mixer shaft 23 here too take the form of one integral, continuous shaft, which in an extraction press section carries the screw conveyor 21 and in a mixer section carries the mixer shaft 23. A bearing 34 of the mixer shaft 23 and the screw conveyor 21 is also illustrated.

The mixer shaft 23 is thereby likewise set in rotational movement by the adjustable-speed drive 16 (not represented here, see FIG. 1) and therefore rotates at the same speed as the screw conveyor 21. This is advantageous but not absolutely essential.

The first extraction press 6 further comprises a filling level sensor 24. The position of the filling level sensor 24 on the extraction press 6 is advantageously selected so that the filling level sensor 24 is able to sense a filling level of the extraction press 6 which is equivalent to a complete or at any rate substantially complete filling of the first extraction press 6 with butter grains. This target filling level also means that the maximum pressure in the extraction press 6, particularly advantageous for this method, can be achieved.

For this purpose, the filling level sensor 24 is preferably advantageously arranged in the transitional area between the inlet(shaft) 18 of the extraction press 6 for the butter grains and the first screw channel after the inlet shaft 18 in the delivery direction F. This allows sensing of a filling level in the first extraction press 6 which corresponds to a complete filling of the extraction press 6.

According to a preferred variant the filling level sensor 24 may be positioned on the side of the hollow-cylindrical body 20 of the first extraction press 6 situated opposite the inlet 18, parallel to an imaginary center line of the inlet 18. In the direction in which the screw conveyor 21 of the first extraction press 6 extends, the filling level sensor 24 is separated by a dimension X from the furthest wall of the inlet 18 facing towards the outlet 19 of the extraction press 6. The dimension X is preferably between 0 and 30%, more preferably between 5 and 10% of the internal width W of the inlet 18.

At the same time, a maximum filling level in the extraction press 6 also means a maximum pressure inside the extraction press 6. This is a desirable state to be aimed for.

The first extraction press 6 comprises a pressure sensor 25 for sensing the pressure in the extraction press 6. The pressure sensor 25 here is positioned on the hollow-cylindrical body 20 of the first extraction press 6 just in front of its outlet 19. The pressure sensor 25 may advantageously be arranged between the end of the screw conveyor 20 formed in the delivery direction (or after its last screw channel) and the mixing section 7.

At its outlet-side end the first mixing section 7 comprises a restrictor 31 which consists, for example, of a barrage 32 with openings 33, which can be fully or partially closed by a (here) internal restrictor plate 26. The restrictor plate 26 has one or more openings 27 and can be displaced by adjusters, such as a control motor 28, for example, so that the remaining opening cross section of the openings 33 in the barrage 32 is adjustable. The restrictor plate 26 thereby forms a type of diaphragm gate valve. Alternatively, it is also feasible to provide multiple driven slit or iris diaphragms, the opening cross section of which can then be adjusted by a control motor.

When starting up the butter-making machine, the restrictor 31 at the end of the first mixing section 7 at first remains closed for filling of the extraction press. Butter now passes via the inlet 18 into the first extraction press 6, where it is pressed into the mixing section 7 by the screw conveyor 21. After the mixing section 7 has been filled with butter, the first extraction press 6 fills until the butter reaches the filling level sensor 24.

In this way the maximum filling level of the first extraction press 6 is detected, which starts the self-learning pressure feedback control. The term "self-learning" means that the feedback control is itself able to determine the set values of the reference variables for the feedback control when the process is starting up. The self-learning feedback control first regulates the speed of the screw conveyor 21 of the first extraction press 6 as a function of the flow rate.

The fine adjustment of the pressure in the first extraction press 6 is performed by the feedback control of the aperture of the restrictor 31. On the principle of "greatest pressure at maximum filling level" it is possible to predetermine the optimum operating point of the drive 16 of the extraction press 6 as a function of the flow rate.

The self-learning feedback control therefore now has the function of constantly maintaining the filling level of the extraction press 6 at the optimum level and at the same time of maintaining a defined pressure set value at the position of the pressure sensor 25.

When the first extraction press 6 is completely filled and the restrictor 31 closed, the pressure in the first extraction press 6 attained in this state is registered by the pressure sensor 25.

A set value selected for the ensuing feedback control is preferably somewhat less than the maximal possible pressure (for example minus 5-20%, preferably minus 10%) and is used as the basis of a first reference variable for the automated electronic feedback control.

The speed of the screw conveyor 21 may advantageously be regulated so that at least the one filling level sensor 24 is just covered. The sensed filling level is preferably a further reference variable of the automated electronic feedback control.

In parallel with this, the aperture of the restrictor 31 is adjusted so that the pressure on the pressure sensor 25 is somewhat below the maximum possible pressure in the first extraction press 6, which as described above has automatically or in parallel with the self-learning process been determined as reference variable.

In trials, a typical value for the maximal attainable pressure at maximum filling level of the first extraction press 6 with the restrictor 31 closed was determined as 10 bar. With the restrictor 31 fully opened the pressure dropped to 8 bar.

The installed filling level sensor 24 at the same time serves as overflow safeguard for the inlet 18 and for the butter-refining drum 5. This prevents possible damage in the event of an overfilled and jamming first extraction press 6 and improves the processing reliability of the machine.

The self-learning pressure control for fine adjustment of the maximum filling level may be equipped with sensors, which function on a working principle such as impedance spectroscopy, ultrasound or radiometry. They may also be based on some other working principle, however.

The speed of the screw conveyor of the second extraction press 9 may be synchronized and regulated using the speed of the screw conveyor 19 of the first extraction press 6 as control variable.

In order to prevent overfilling of the second extraction press 9, the speed of the screw conveyor of the second extraction press 9 may be set slightly higher than the speed of the screw conveyor 21 of the first extraction press 6.

The second extraction press 9 can also be automatically electronically regulated in such a way. This feedback control may operate in the same way as the feedback control of the first extraction press 6 or the steps 400 and 500 as a function of the feedback control of the first extraction press 6. It is also possible, however, simply to set a speed on the screw conveyor of the second extraction press 9 that is always somewhat—for example 1-10%—higher than the speed of the screw conveyor 21 of the first extraction press 6.

The automatic extraction press and restrictor plate control may advantageously also be used as a beneficial supplement to the method of optimizing an automated butter-making process according to the technical teaching of DE 10 2011 117 195 A1. This means that for all practical purposes the butter-making process can very largely be fully automated.

Then, in the step 100), at least one characteristic value of the cream is measured or predetermined and an actual value for the instantaneous drive output of the beater is registered; a set value for the drive output of the beater is determined as a function of the characteristic value and the beater speed is adjusted until this set value for the drive output is attained.

It is advantageous if, in the step 100), the cream temperature and/or the cream fat content is used as the characteristic value.

By automating the two most important influential factors for the automatic butter-precipitation process (steps 100 and 400/500), a butter-making machine can advantageously be operated fully automatically.

In addition, due to the extraction press and restrictor plate control, an optimally stable, low basic water content is achieved, with the result that the butter-making process and thereby the butter-making machine can advantageously be run reliably and with little deviation from set value at the upper water dosing limit and an optimum butter output quantity can be achieved.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS inlet 1
butter-making cylinder 2
beater 3
cooling section 4
butter-refining drum 5
extraction press 6
mixing section 7
vacuum chamber 8
extraction press 9
mixing section 10
discharge pump 11
beater drive 12
drive 13
viewing window 14
measurement and control unit 15
drive 16
drive 17
inlet 18
outlet 19
body 20
screw conveyor 21
body 22
mixer shaft 23
filling level sensor 24
pressure sensor 25
restrictor plate 26
opening 27
control motor 28
agitator blade 29
perforated plate 30
restrictor 31
barrage 32
openings 33
bearing 34
steps 100, 200, 300, 400, 500, 600, 700, 800
dimension X
width W
delivery direction F

The invention claimed is:

1. A method for producing butter in a butter-making machine, the butter-making machine comprising an inlet, a butter-making cylinder with a rotatable beater, a butter-refining drum and a first extraction press, and a first mixing section arranged downstream thereof, the method comprising:
   a) forming, by the rotatable beater in the butter-making cylinder, butter grains and butter milk from cream supplied to the butter-making cylinder;
   b) performing, in the butter-refining drum, a butter-refining process in which a butter grain size is adjusted;
   c) kneading the butter grains in the first extraction press, which comprises a hollow body containing one or two screw conveyors having a speed that is regulated by an adjustable-speed drive, wherein a basic water content of the butter is also reduced;
   d) varying, in the first mixing section, a cross-section of an outlet opening of a restrictor, wherein the speed of the adjustable-speed drive and a size of the cross-section of the outlet opening of the restrictor are controlled in an electronically self-regulating manner, wherein step c) further comprises
determining a pressure in the first extraction press exerted by the butter grains or the butter;
determining a filling level in the first extraction press; and
using the determined pressure and determined filling level as reference variables of the electronic self-regulation, wherein the first extraction press comprises a filling level sensor positioned on the first extraction press so that the filling level sensor can sense a filling level in the first extraction press, the filling level is equivalent to a complete filling of the first extraction press with the butter grains or butter.

2. The method of claim 1, wherein step c) further comprises:
using a speed of the screw conveyor of the first extraction press as a control variable of the electronic self-regulation.

3. The method of claim 1, wherein
step d) further comprises discharging the butter from the first mixing section through the restrictor, and
step c) further comprises using the size of the cross-section of the outlet opening of the restrictor as control variable of the electronic self-regulation.

4. The method of claim 1, wherein the first extraction press comprises a pressure sensor, which is positioned in the hollow body of the first extraction press in front of an outlet of the hollow body.

5. The method of claim 1, wherein a set value of a pressure at an outlet-side end of the first extraction press is a maximum of 10 bar and a minimum of 9 bar.

6. The method of claim 1,
wherein the filling level sensor is positioned on the first extraction press so that the filling level sensor can sense a filling level in the first extraction press, the filling level is equivalent to a complete filling of the first extraction press with the butter grains or butter.

7. The method of claim 1, wherein the reference variables or set values of the reference variables used in the self-regulation are determined by self-learning during the process of buttermaking and/or during a start-up phase of the process of buttermaking.

8. The method of claim 1, further comprising:
e) extracting, in a vacuum chamber, air from the butter after step d) to improve keeping qualities of the butter.

9. The method of claim 8, further comprising:
f) feeding the butter into an inlet of a second extraction press after step e) to extract more water and to optimize a water content of the butter.

10. The method of claim 9, further comprising:
g) mixing, in a second mixing section, the butter to achieve a uniform distribution of the water content in the butter and an optimized water content of the butter after step f).

11. The method of claim 9, further comprising:
electronically regulating one or both of the steps e) and f).

12. The method of claim 1, wherein in step a) further comprises:
measuring at least one characteristic value of cream or using a predetermined characteristic value of the cream;
registering an actual value for the instantaneous drive output of the rotatable beater; and
determining a set value for the instantaneous drive output of the rotatable beater as a function of the at least one characteristic value;
adjusting a speed of the rotatable beater until the set value for the drive output is attained.

13. The method of claim 1, wherein in step a) a cream temperature and/or cream fat content is used as a characteristic value.

14. The method of claim 1, further comprising:
performing a visual check on the production of the butter in the butter-refining drum via a viewing window.

15. The method of claim 1, wherein the pressure and the filling level are determined directly.

16. A method for producing butter in a butter-making machine, the butter-making machine comprising an inlet, a butter-making cylinder with a rotatable beater, a butter-refining drum and a first extraction press, and a first mixing section arranged downstream thereof, the method comprising:
starting the butter-making machine and maintaining a restrictor at a downstream end of the first mixing section in a closed position;
feeding butter grains into the first extraction press, which kneads the butter grains, and feeding the kneaded butter grains into the first mixing section;
determining, using a filling level sensor arranged between an inlet shaft of the first extraction press and a first screw channel of the inlet shaft of the first extraction press, that a filling level of the first extraction press corresponds to a complete filling of the first extraction press;
performing a self-learning feedback control process responsive to the determination that the filling level of the first extraction press corresponds to the complete filling of the first extraction press, wherein the self-learning feedback control process comprises
determining, by a pressure sensor, a pressure in the first extraction press exerted by the butter grains or the butter when the first extraction press corresponds to the complete filling of the first extraction press; and
determining an operating point for a drive of a screw conveyer of the first extraction press as a function of flow rate butter grains in the first extraction press so that the filling level of the first extraction press corresponds to the complete filling of the first extraction press;
operating the butter-making machine using the determined pressure and determined operating point by
determining, using the filling level sensor, a current filling level of the first extraction press;
determining, using the pressure sensor, a current pressure in the first extraction press exerted by the butter grains or the butter;
adjusting, based on the determined current filling level, a speed of the drive of the screw conveyor using the determined operating point; and
controlling, based on the determined current pressure, a size of an opening of the restrictor to achieve the determined pressure in the first extraction press.

17. The method of claim 16, wherein the pressure sensor directly determines the pressure in the first extraction press exerted by the butter grains or the butter and the filling level sensor directly determines a filling level of the first extraction press.

* * * * *